(12) United States Patent
Nishimura et al.

(10) Patent No.: US 7,290,934 B2
(45) Date of Patent: Nov. 6, 2007

(54) FLUID DYNAMIC-PRESSURE BEARING DEVICE AND SPINDLE MOTOR

(75) Inventors: Hideki Nishimura, Kyoto (JP); Yoshito Oku, Kyoto (JP)

(73) Assignee: Nidec Corporation, Kyoto (JP)

( * ) Notice: Subject to any disclaimer, the term of this patent is extended or adjusted under 35 U.S.C. 154(b) by 211 days.

(21) Appl. No.: 11/162,367

(22) Filed: Sep. 8, 2005

(65) Prior Publication Data

US 2006/0051001 A1    Mar. 9, 2006

(30) Foreign Application Priority Data

Sep. 9, 2004    (JP) ............................. 2004-261975

(51) Int. Cl.
    *F16C 32/06*    (2006.01)
(52) U.S. Cl. ...................... 384/107; 384/112
(58) Field of Classification Search ............... 384/100, 384/107, 112, 121, 123; 360/99.08, 98.07
See application file for complete search history.

(56) References Cited

U.S. PATENT DOCUMENTS 5,723,927 A * 3/1998 Teshima ............... 384/100
6,456,458 B1 * 9/2002 Ichiyama .............. 360/99.08
6,914,358 B2 7/2005 Tokunaga et al.
2003/0091250 A1 5/2003 Gomyo
2004/0091187 A1 5/2004 Aiello et al.
2004/0212921 A1 10/2004 Herndon et al.
2005/0069232 A1 3/2005 Aiello et al.
2005/0219742 A1 * 10/2005 Herndon et al. ......... 360/99.08

FOREIGN PATENT DOCUMENTS

JP    2001-065552 A    3/2001
JP    2003-14857 A    5/2003

* cited by examiner

*Primary Examiner*—Thomas R. Hannon
(74) *Attorney, Agent, or Firm*—Volentine & Whitt, PLLC

(57) ABSTRACT

Small-size, small-height fluid dynamic-pressure bearing device that causes a low shaft loss and is less prone to troubles such as shortage and leakage of lubricating liquid. A thrust dynamic-pressure bearing is formed at an inner position and a region having a slightly-widened gap is provided outside of the thrust dynamic-pressure bearing to retain the lubricating liquid therein. Further, an oil circulating path is communicated with the region having a slightly widened gap. The gap of this region is set to be greater than the gap at the thrust dynamic-pressure bearing portion by the value of the depth of dynamic-pressure generating grooves. The region having a widened gap may be provided with rows of grooves for stirring-up lubricating oil towards the center.

20 Claims, 13 Drawing Sheets

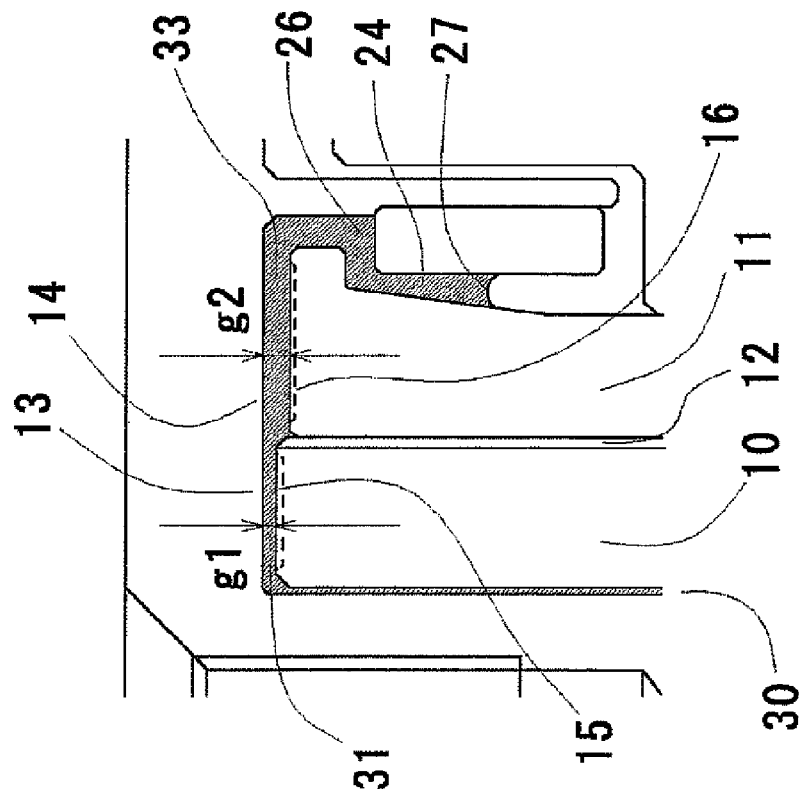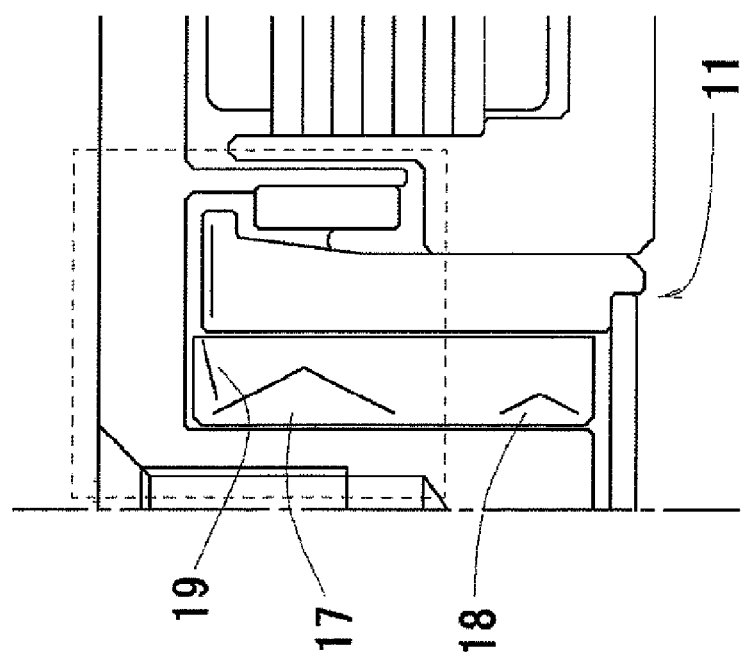
FIG. 4B
FIG. 4A

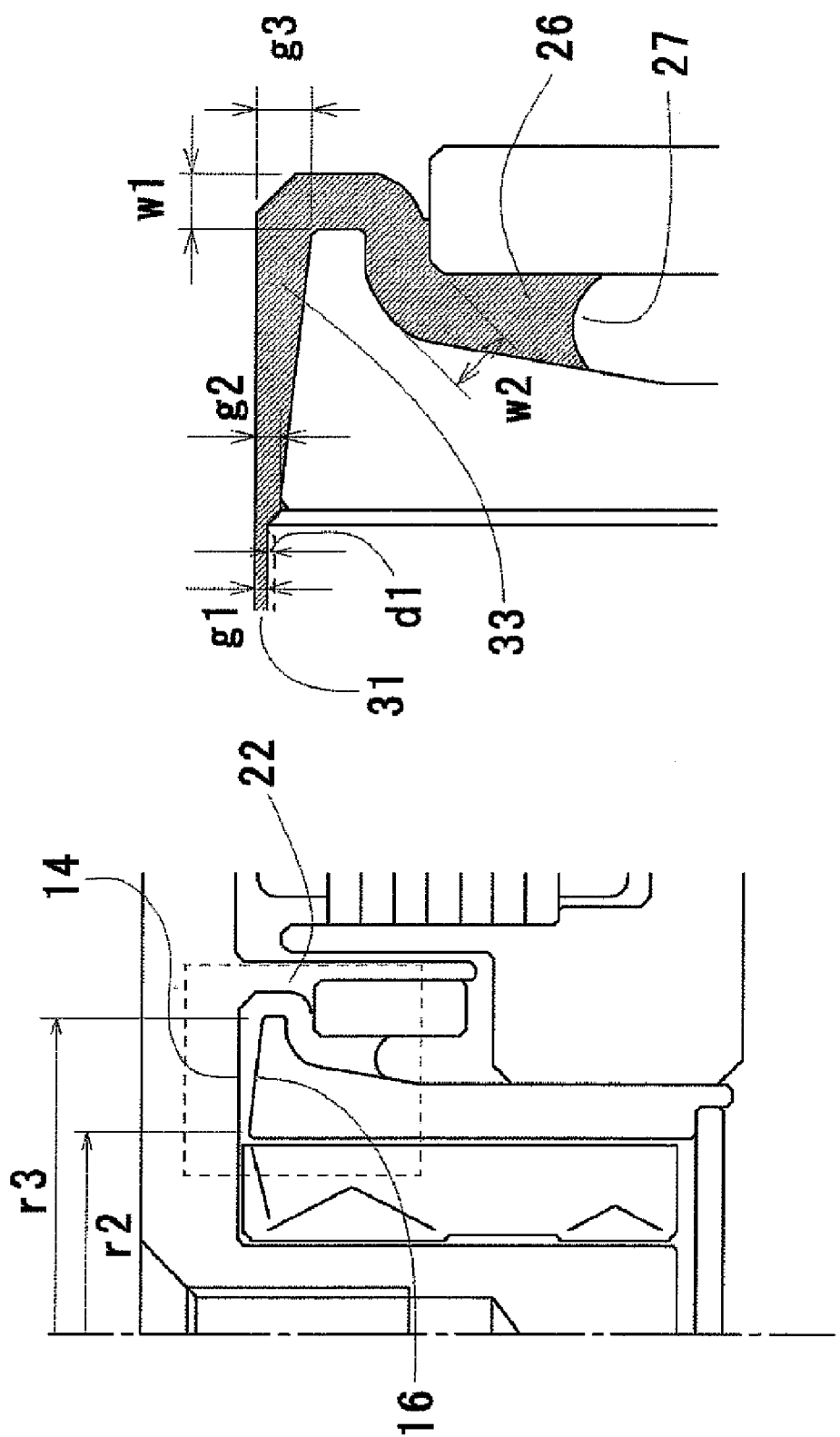

FLUID DYNAMIC-PRESSURE BEARING DEVICE AND SPINDLE MOTOR

BACKGROUND OF THE INVENTION

1. Field of the Invention

The present invention relates to fluid dynamic-pressure bearing devices for use in hard disk driving devices and hard disk devices incorporating the fluid dynamic-pressure bearing device for rotatably supporting the disk mounting portion.

2. Description of the Related Art

In recent years, miniaturization of personal computers and mounting of hard disks into compact-size portable apparatuses have been advanced. Furthermore, miniaturization of hard disks has been also advanced from a conventional size of 3.5 inch size to more miniaturized sizes such as 2.5 inch and 1.0 inch or less. In view of such trends, there has been a need for miniaturization of fluid dynamic-pressure bearing devices for supporting the hub of a hard disk.

FIG. 11 illustrates a fluid dynamic-pressure bearing which places the hub lower surface on the upper surface of a sleeve such that they face each other with a narrow gap sandwiched therebetween to form a thrust dynamic-pressure bearing and places a tapered sealing portion on the sleeve side surface. With this configuration, the use of a thrust plate can be omitted to reduce the height of the bearing device.

FIG. 12 illustrates a dynamic-pressure bearing device including herringbone shaped thrust dynamic-pressure generating grooves and grooves provided outside thereof for feeding lubricating liquid towards the bearing center. This configuration can prevent the leakage of the lubricating liquid even during high-speed rotation of the bearing.

Although these bearing devices exhibit preferable characteristics, they also suffer certain drawbacks during operation.

With the dynamic-pressure bearing device of FIG. 11, the lubricating liquid can not be circulated between the shaft tip end and the thrust bearing portion, which may induce a significant pressure difference between the shaft tip end portion and the thrust bearing side. With the dynamic-pressure bearing device of FIG. 12, redundant rows of grooves are provided for feeding oil on the thrust dynamic-pressure bearing surface, which prevents sufficient reduction of the resistance during the rotation of the bearing.

FIG. 13 illustrates a dynamic-pressure bearing device which includes a thrust dynamic-pressure bearing portion formed on a sleeve end surface. This device of this example is prone to interruptions of the lubricating liquid outside of the thrust dynamic-pressure bearing portion. In addition, this device is prone to accidental discharge of oil to the outside due to the influence of the rotating hub, which has made it impossible to ensure high reliability.

It is an object of the present invention to realize reliable and small-size fluid dynamic-pressure bearing devices which include a bearing with a small height, induce small shaft losses and are less prone to troubles such as shortage and leakage of lubricating liquid.

BRIEF SUMMARY OF THE INVENTION

According to the present invention, the interface of lubricating liquid is placed on the side surface of the bearing and the bearing gap and the interface are communicated with each other through an annular gap. With this configuration, the annular gap portion also serves as an oil buffer, thus easily maintaining the amount of oil. Further, this configuration is widened in the radial direction of the bearing, thus enabling reduction of the height of the bearing device.

In a conventional fluid dynamic-dynamic bearing device, the thrust dynamic-pressure bearing has been formed at such an annular gap portion, and thus it has been positioned radially outside of the bearing, thus causing an increase in shaft loss. Particularly, in the case of a compact-size bearing, such losses in the thrust dynamic-pressure bearing are relatively large. It is easy to form thrust dynamic-pressure grooves at a more inward position in the radial direction in order to overcome the problem. However, even in such a case, an annular gap is left, thus preventing sufficient reduction of-the in shaft loss.

According to the present invention, in order to reduce the resistance at the annular gap portion, the dimension of the annular gap is made greater than the gap of the thrust dynamic-pressure bearing portion (hereinafter, referred to as a thrust narrow gap). The difference in the gap dimension is set to be equal to or greater than the average depth of the thrust dynamic-pressure generating grooves. This enables reduction of the resistance, thus reducing the bearing loss.

In the present invention, grooves having a spiral shape or the like may be formed at the annular gap portion to stir up lubricating liquid in the inward direction of the bearing. This causes inward flows of the lubricating liquid along the stirring-up grooves. When air bubbles are contained in the lubricating liquid, the air bubbles are pushed out to the outside of the annular gap as a reaction of the inward lubricating liquid. Thus, air bubbles in the lubricating liquid are effectively discharged. If air bubbles are accumulated within the annular gap portion, this may cause troubles such as leakage of the lubricating liquid since the lubricating oil is pushed out due to the thermal expansion of air bubbles. With the present invention, such air bubbles can be discharged, thus increasing the reliability of the bearing.

In to the present invention, a communicating path may be provided in the fixed member to communicate the outer periphery of the thrust narrow gap with the end portion of the radial narrow gap. Since the lubricating liquid flows through the communicating path, it is possible to prevent the occurrence of excessive pressure increases and decreases at the tip end portion of the radial narrow gap. Further, this also facilitates discharge of air bubbles generated within the radial bearing.

In the present invention, grooves may be formed on the sleeve outer periphery or the housing inner periphery and, under this condition, the sleeve may be inserted within the housing inner periphery to form the fixed portion. By inserting the sleeve, the open sides of the grooves are closed to form communicating paths extending along the interface between the sleeve and the housing. In comparison with the process for forming a narrow hole, communicating paths can be easily formed. Further, the shape of the communicating paths is not limited to a straight line and may be a spiral shape and the like.

In the present invention, an annular pull-out preventing member may be mounted on the hub and the annular pull-out preventing member may be placed to engage with a sleeve expanded portion at the axially opposite side thereof to form a pull-out preventing portion. This enables formation of a pull-out preventing portion at the side portion of the bearing, thus reducing the height of the bearing device.

In the present invention, the gap between the inner peripheral surface of the pull-out preventing member and the outer peripheral surface of the sleeve may have a tapered shape which is gradually widened to retain the lubricating liquid. This enables checking the position of the lubricating liquid from below the pull-out preventing member, thus enabling increasing the efficiency of operations for checking the state of the injected lubricating liquid, particularly in the case of mass production.

In the present invention, the dimension of the annular gap may be gradually increased towards the outer periphery thereof. Also, such a portion may be partially formed. This configuration facilitates discharge of air bubbles in the lubricating liquid towards the outer periphery of the annular gap, namely towards the sealing portion.

The annular gap is a gap sandwiched between the flange surface and the annular surface and, during the rotation of the bearing, the annular surface and the flange surface are rotated relative to each other. Consequently, radial shear flows are generated in the lubricating liquid retained within the annular gap. Air bubbles in shear flows are deformed since they are affected by the flows. This will cause increases of the surface areas of air bubbles. When the shear flows are weak, respective air bubbles have an almost spherical shape and have a small surface area. Since the increase or decrease of the surface area of each air bubble indicates the increase or decrease of the surface energy, air bubbles tend to be concentrated at portions at which shear flows are weak and their surface energies can be reduced, within a liquid in which there are differences of the shear flow strength.

Since the peripheral velocity of rotation is increased with decreasing distance to the periphery, when the dimension of the annular gap is constant air bubbles tend to be concentrated at inner portions of the gap. By gradually increase the dimension of the annular gap towards the outer periphery thereof, this tendency can be at least partially cancelled. More specifically, the dimension g of the gap can be varied in the radial direction such that the ratio r/g between the distance r from the rotation center and the dimension g of the gap at the position is gradually decreased in the outward direction.

This configuration for varying the dimension of the gap is more effective when it is combined with stirring-up grooves provided at the annular gap portion as previously described.

With the present invention, the dimension of the sealing gap positioned near the lubricating-liquid interface can be made greater than the dimension of the annular gap positioned inside of the bearing device. In this case, shear flows as aforementioned are reduced near the sealing gap, namely near the air/liquid interface of the lubricating liquid. Since air bubbles in the lubricating liquid are subjected to forces which discharge them towards the interface, they are effectively discharged from the fluid dynamic-pressure bearing device.

In the present invention, the thrust bearing surface of the hub and the annular surface outside thereof may be positioned on different planes. As an example of this configuration, an annular step portion may be provided on the bottom surface of the hub so that the portion inside of the step portion forms the thrust bearing surface while the portion outside thereof forms the annular surface. Also, the annular surface may be inclined with respect to the thrust bearing surface. This invention enables increasing the flexibility of the design of the hub shape, thus enabling the realization of more miniaturized spindle motors.

In the present invention, the thrust dynamic-pressure bearing may be configured to increase the pressure of the lubricating liquid inwardly in the radial direction. Since the pressure of the lubricating liquid is higher at the center of the bearing while it is lower at the outer portion within the thrust dynamic-pressure bearing, there is provided the effect of discharging air bubbles in the lubricating liquid to the outside of the thrust dynamic-pressure bearing. Thus, air bubbles can be effectively discharged from the bearing device.

In to the present invention, the thrust dynamic-pressure bearing portion may have a concentric double configuration. This enables generation of a larger supporting force.

According to the present invention, there are provided, for supporting the radial load, a pair of radial dynamic-pressure bearings configured such that the pressure of the lubricating liquid is increased with increasing distance from the shaft ends. This configuration can raise the pressure of the lubricating liquid to above the atmospheric pressure at the bearing gap between the two radial dynamic-pressure bearings, thus preventing the occurrence of air bubbles due to negative pressures. Further, when the two radial dynamic-pressure bearings have different degrees of lubricating-pressure-raising effect, it is possible to circulate the lubricating liquid in a single direction.

In addition to this configuration, it is possible to combine a configuration for increasing the pressure of the lubricating liquid inwardly in the radial direction of the thrust dynamic-pressure bearing. In this case, it is preferable to configure the thrust dynamic-pressure bearing such that it can cancel the lubricating liquid flows caused by the radial dynamic-pressure bearing.

In the present invention, the sleeve may be formed from a porous material. This enables an increase in the amount of oil retained in the bearing device. By inserting an inner mold into the inside of the sleeve and thereafter pressing it from outside, dynamic- pressure generating grooves may be formed on the sleeve inner peripheral surface.

By applying the dynamic-pressure bearing device according to the present invention to a spindle motor, it is possible to realize a reliable spindle motor which requires a low electric current. Also, by applying this spindle motor to a hard disk drive, it is possible to provide a reliable hard disk drive.

Further, the bearing and the spindle motor according to the present invention are applicable to polygon scanners and also applications for rotating and driving a removable medium such as a DVD, as well as hard disk drives.

BRIEF DESCRIPTION OF THE SEVERAL VIEWS OF THE DRAWINGS

FIGS. 4A and 4B are enlarged views of a fluid dynamic-pressure bearing device according to an embodiment of the present invention.

FIGS. 6A and 6B illustrate a modified embodiment 1 of the fluid dynamic-pressure bearing device according to the embodiment of the present invention.

DETAILED DESCRIPTION OF THE INVENTION

Hereinafter, there will be described embodiments of a fluid dynamic-pressure bearing device according to the present invention and embodiments of spindle motors and a hard disk drive which incorporate such a fluid dynamic-pressure bearing device.

First Embodiment

Figure 1:
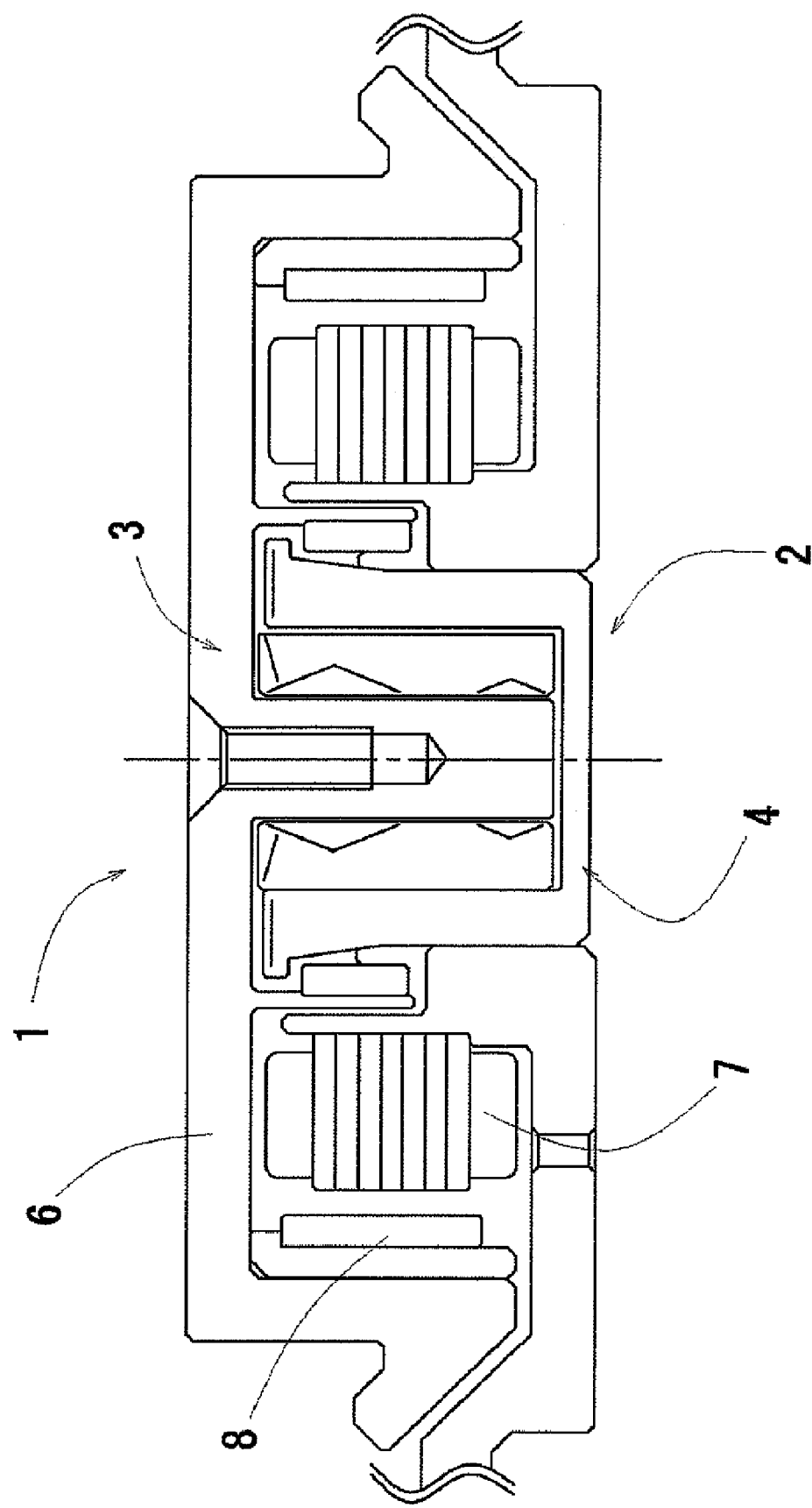
FIG. 1 is a cross-sectional view of a spindle motor according to an embodiment of the present invention.

FIG. 1 is a cross-sectional view of a spindle motor 1 according to the present embodiment. The spindle motor 1 incorporates a fluid dynamic-pressure bearing device 2 according to the present embodiment and a rotor 6 is supported by the fluid dynamic-pressure bearing device 2 such that it is rotatable with respect to a fixed portion 4.

The fixed portion 4 is constituted by a base plate and a stator 7 secured thereon and the fluid dynamic-pressure bearing device 2 is also installed on the fixed portion at the center portion thereof. The outer periphery of the stator faces a rotor magnet 8 mounted on the rotor 6 in the radial direction and, when the stator is energized with a proper phase, the rotor magnet 8 is subjected to a rotational driving force centered on the bearing device, thus causing the rotor to rotate.

Figure 2A:
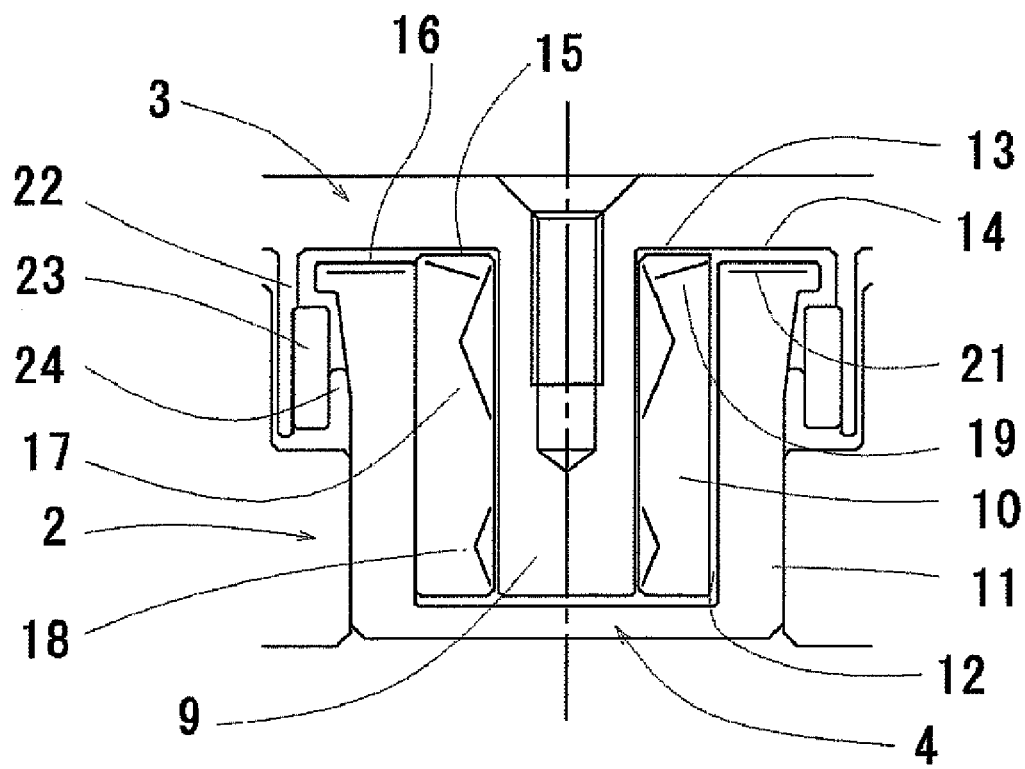
FIGS. 2A and 2B are views of a fluid dynamic-pressure bearing device according to an embodiment of the present invention.
Figure 2B:
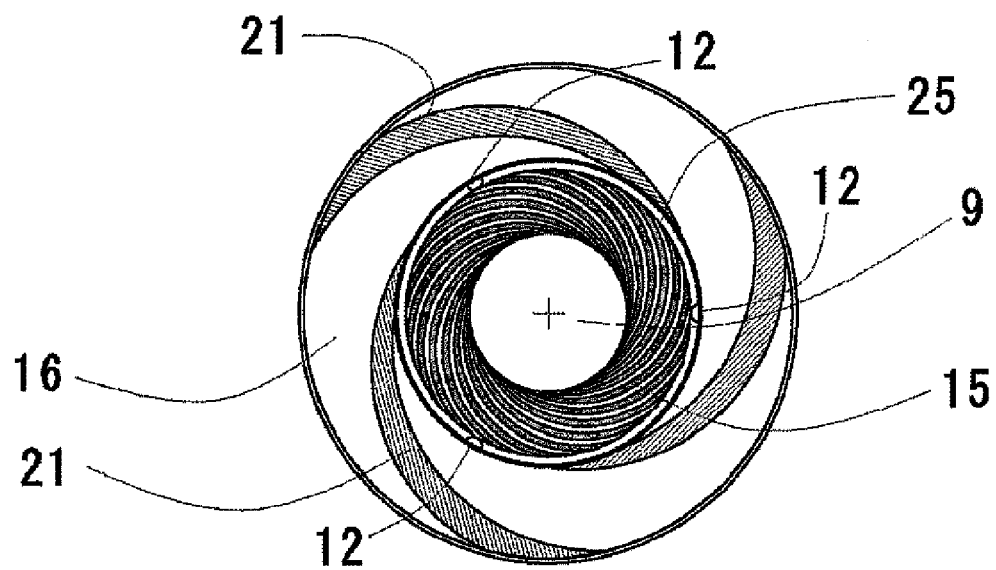

FIG. 2 are views illustrating detail portions of the fluid dynamic-pressure bearing device 2 and FIG. 2A is a cross-sectional view and FIG. 2B is a plan view from above wherein a hub 3 and a shaft 9 are removed. The fixed portion 4 is constituted by a housing 11 and a sleeve 10 inserted within the inner periphery of the housing. The shaft 9 is rotatably inserted into the sleeve 10.

In FIG. 2A, radial dynamic-pressure bearings 17 and 18 are configured along the longitudinal direction of the shaft 9 and support the radial load. The upper end surface of the sleeve 10 forms a thrust bearing surface 15 of the fixed portion. The lower surface of the hub 3 forms a thrust bearing surface 13 of the hub and constitutes a thrust dynamic-pressure bearing 19 in cooperation with the thrust bearing surface 15 of the fixed portion. There is an annular surface 14 radially outside of the thrust bearing surface 13 of the hub. The upper end of the housing forms a flat flange surface 16 which is extended outwardly in the radial direction and faces the annular surface 14 in the axial direction. The space between the annular surface and the flange surface is communicated to a sealing gap 24 at the outer periphery thereof. The sealing gap 24 is a space which is formed between the outer peripheral surface of the housing 11 and the inner peripheral surface of a pull-out preventing member 23 and is gradually widened to the lower portion thereof. The interface of lubricating liquid is formed within the sealing gap portion and thus the lubricating liquid fills the inside thereof substantially without causing interruptions.

The lower end portion of the radial dynamic-pressure bearing 18 and the thrust dynamic-pressure bearing 19 are communicated with each other through a communicating path 12 formed around the outer peripheral surface of the sleeve 10. In the event of the occurrence of air bubbles near the lower end portion of the radial dynamic-pressure bearing, the air bubbles are discharged through the communicating path 12. In the event of the occurrence of a significant lubricating-liquid pressure difference between the radial bearing lower end portion and the thrust dynamic-pressure bearing side, the lubricating liquid is communicated therebetween through the communicating path 12 to average the pressure.

In FIG. 2B, there is illustrated a groove pattern. Thrust dynamic-pressure generating grooves 25 are formed on the thrust bearing surface 15 of the fixed portion and have a spiral shape. Stirring-up grooves 21 are formed on the flange surface 16. The stirring-up grooves 21 are also spirally shaped and, during the rotation of the shaft, they stir up oil towards the center of the bearing, while air bubbles within the oil tend to be discharged outwardly in the radial direction of the bearing.

In FIG. 1 and FIG. 2A, the radial dynamic-pressure bearings 17, 18 and the thrust dynamic-pressure bearing are represented by lines inclined with respect to the bearing surfaces. The inclinations of these lines represent the general outline of the pressure change in the lubricating liquid along the dynamic-pressure bearings.

The lines representing the thrust dynamic-pressure bearing 19 are inclined such that they are separated from the bearing surface at the center of the bearing. This indicates that the pressure of the lubricating liquid is gradually increased from the outer periphery of the thrust dynamic-pressure bearing towards the center thereof. The thrust dynamic-pressure generating grooves 25 are spirally shaped and are identical to those in the view of FIG. 2A.

The lines representing the radial dynamic-pressure bearings 17 and 18 are close to the bearing surface at the both sides and are far from the bearing surface at their centers. This indicates that the pressure is lower at the both ends of the dynamic-pressure bearings and is gradually increased towards their centers. In the case where the radial dynamic-pressure bearings are provided with dynamic-pressure generating grooves having a herringbone shape, the pressure of lubricating liquid is changed substantially similarly thereto. Further, in FIG. 2, the stirring-up grooves 21 are drawn to be substantially parallel with the flange surface 16 on which these grooves are formed. This represents that there are large gaps between the stirring-up grooves and thus the grooves generate small pressure differences.

Figure 3:
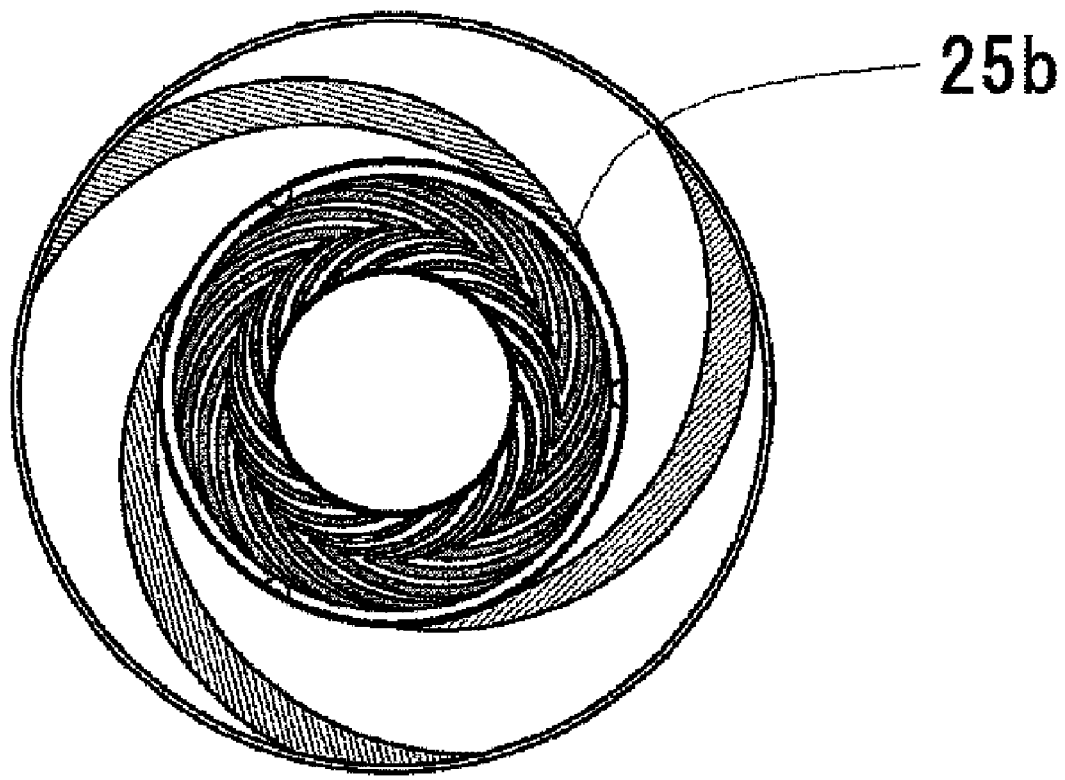
FIG. 3 illustrates another embodiment of thrust dynamic-pressure generating grooves.

FIG. 3 illustrates another example of thrust dynamic-pressure generating grooves. The thrust dynamic-pressure generating grooves 25b are constituted by inward spiral grooves and outward spiral grooves which are placed inside of the inward spiral grooves. In this case, a greatest dynamic pressure is generated between the two types of spirals, thus generating a larger supporting force. Further, the entire thrust dynamic-pressure generating grooves 25b act to inwardly increase the pressure since the outer spirals generate a greater pressure.

FIG. 4A is an enlarged view of the right half portion of FIG. 2A, and FIG. 4B is an enlarged view of the portion encircled by the dotted line in FIG. 4A.

In FIG. 4B, a radial narrow gap 30, a thrust narrow gap 31 and an annular gap 33 are communicated with one another in the mentioned order and are filled with a lubricating liquid 26. The outer peripheral portion of the annular gap 33 is communicated with the sealing gap 24 and the sealing gap is partway filled with the lubricating liquid to form a lubricating-liquid/air interface 27.

The dimension g2 of the annular gap 33 is greater than the dimension g1 of the thrust narrow gap 31.

Figures 5A, 5B:
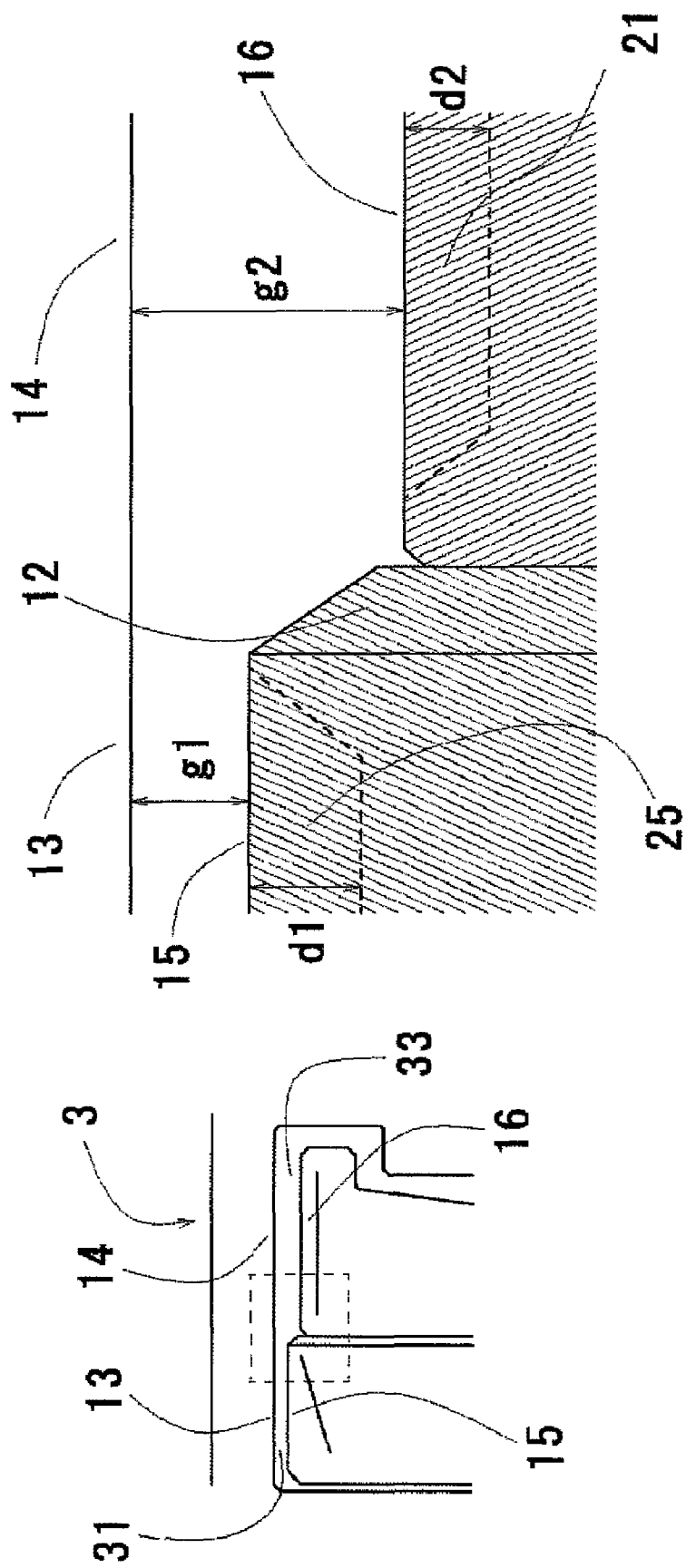
FIGS. 5A and 5B are views for explaining of the dimensions of gaps.

FIG. 5 is views illustrating, in more detail, the difference between the dimensions g1 and g2, wherein FIG. 5B illustrates the portion encircled by the dot line in FIG. 5A in an enlarged manner.

The dimension g1 of the thrust narrow gap is the distance between the top portions of the thrust dynamic-pressure generating grooves 25 and the thrust bearing surface 13 of the hub. Similarly, the dimension g2 of the annular gap is the distance between the top portions of the stirring-up grooves and the annular surface 14. In the fluid dynamic-pressure bearing device according to the present invention, the annular gap 33 is provided for facilitating the circulation of the lubricating liquid through the communicating path 12, not for supporting the bearing. Therefore, there is no need for generating a dynamic pressure at this portion. By designing the device such that g2 is greater than g1. plus the depth d1 of the thrust dynamic-pressure generating grooves 25, the aforementioned object can be substantially attained. Further, by setting the dimension d2 to be less than twice the dimension d1, the object can be attained more certainly.

Namely, this condition regarding g1, d1 and g2 means that the flange surface 16 should be lower than the bottoms of the thrust dynamic-pressure generating grooves 25. However, in general, the thrust bearing surface 13 of the hub and the annular surface 14 are made to be at different heights by providing a step therebetween. A general condition which can be applicable to such a case is g2>g1+d1. When the bearing is not rotating and the thrust bearing surface of the hub is contacting to the sleeve, the condition is expressed as g2>d1. In the case of FIG. 5, the dimensions are as follows; d1=7 micrometers, g1=11 micrometers, g2=23 micrometers, and d2=7 micrometers.

Second Embodiment

FIG. 6A illustrates a modified embodiment which is provided by making a partial modification to the fluid dynamic-pressure bearing device according to the first embodiment. FIG. 6B illustrates an enlarged view of the portion encircled by the dotted line in FIG. 6A.

In the fluid dynamic-pressure bearing device, the flange surface 16 is inclined outwardly in the radial direction of the bearing. Thus, the dimension of the annular gap is g2 near the inner periphery of the flange surface 16, while it is g3 which is greater than g2 near the outer periphery thereof. Further, the distance w1 between the outer periphery of the flange surface and the inner peripheral surface of the cylindrical peripheral surface 22 is equal to or greater than g3, and the width w2 of the sealing gap 27 at the base portion thereof is set to be equal to or greater than w1.

With this configuration, radial shear flows within the lubricating liquid are gradually decreased with increasing distance from the center. Thus, air bubbles in the lubricating liquid are easily discharged towards the sealing gap and to the outside of the bearing.

More specifically, the spacing of the respective portions are as follows; g1=11 micrometers, g2=15 micrometers, g3=29 micrometers, w1=0.11 millimeter, W2=0.13 millimeter. The radius r2 of the flange surface inner periphery is 2.4 millimeters, and the radius r3 of the flange surface outer periphery is 3.7 millimeters. The value of r2/g2 is greater than the value of r3/g3, which exerts a force to outwardly discharge air bubbles in the lubricating liquid. Furthermore, the relation g3<w1<w2 holds, which suppresses the backflow of air bubbles discharged from the annular gap. With conventional designs, w1 is much greater than g3 and the velocities of shear flows are significantly reduced outside of w1. Therefore, the effect of shear-flow velocity differences for discharging air bubbles is small between this position and the lubricating-liquid interface 27 and air bubbles are discharged due to the gap differences.

Further, in this case, even if there is locally a portion which does not satisfy the relation g2>g1+d1 near the inner periphery of the flange surface, the effects of the present invention can be provided. Although such a portion which does not satisfy the relation g2>g1+d1 increases the loss of the bearing, it affects to only a portion of the entire flange surface. The relation g2>g1+d1 holds outside of the portion, which suppresses the increase of the loss of the bearing. Further, it also serves as an oil buffer.

Third Embodiment

Figures 7A, 7B:
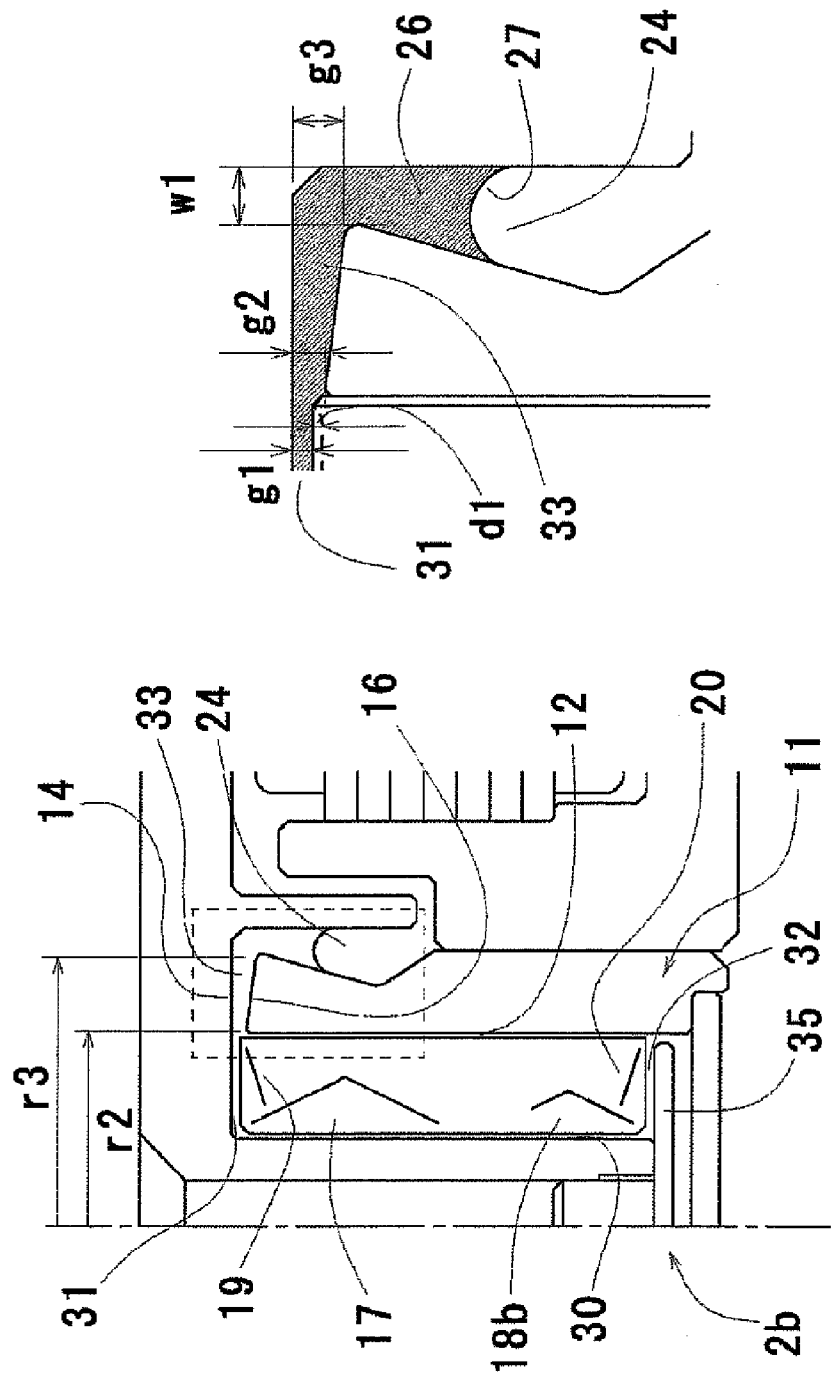
FIGS. 7A and 7B illustrate another embodiment 1 of the fluid dynamic-pressure bearing device according to the embodiment of the present invention.

FIGS. 7A and 7B illustrate another embodiment 1 of the fluid dynamic-pressure bearing device including a thrust plate 35 provided at the shaft tip end. This fluid dynamic-pressure bearing device 2b includes two thrust dynamic-pressure bearings 19 and 20 which generate opposite supporting forces. The annular gap 33 is placed outside of the upper thrust dynamic-pressure bearing 19 and communicates the sealing gap 24 with the bearing gap.

The thrust dynamic-pressure bearings 19 and 20 are both configured to gradually increase the pressure of the lubricating liquid towards the radial bearings. The pair of the dynamic-pressure bearings are placed at the upper and lower portions such that they generate opposite supporting forces. These thrust dynamic-pressure bearings generate dynamic pressures thus generating supporting forces in the thrust direction and also increase the pressure within the radial narrow gap 30. The lubricating liquid comes into contact with atmosphere within the sealing gap portion and thus the concentration of air dissolved therein is the concentration which can keep equilibrium at the atmospheric pressure. Therefore, at the radial narrow gap portion, air is dissolved therein at a concentration lower than the concentration which keeps equilibrium at the pressure, which suppresses the occurrence of air bubbles within the radial narrow gap. The upper and lower thrust dynamic-pressure bearings 19 and 20 are identical and thus do not offer the effect of actively circulating the lubricating liquid.

Further, the thrust dynamic-pressure generating grooves constituting the thrust dynamic-pressure bearings are not limited to spirally-shaped dynamic-pressure grooves as illustrated in FIG. 2B. They may be so-called herringbone shaped dynamic-pressure generating grooves. The thrust supporting forces can be enhanced. However, in this case, the thrust dynamic-pressure generating grooves have unbalanced herringbone shape such that the inward pressure rise is greater within the entire thrust dynamic-pressure bearing.

The pair of radial dynamic-pressure bearings 17 and 18b are configured to increase the pressure of the lubricating liquid from the upper and lower ends of the respective bearings toward their centers. By providing herringbone shaped dynamic-pressure generating grooves, for example, these dynamic-pressure bearings can be configured.

The radial dynamic-pressure bearing 17 placed at the upper portion, out of these radial dynamic-pressure bearings, acts on the lubricating liquid in a symmetric manner upwardly and downwardly and does not offer the effect of actively circulating the lubricating liquid. The radial dynamic-pressure bearing 18b placed at the lower portion of the bearing is configured such that the effect of upwardly raising the lubricating-liquid pressure is greater. Consequently, the radial dynamic-pressure bearings 17 and 18b and the thrust dynamic-pressure bearings 19 and 20 act, in totality, to circulate the lubricating liquid in a single direction. The lubricating liquid proceeds in the lower-to-upper direction through the radial narrow gap 30, reaches the thrust narrow gap 31, passes through the communicating path 12 and then reaches the lower thrust narrow gap 32.

Although a small number of air bubbles are generated even when the pressures within the radial narrow gaps are increased, such air bubbles are discharged through the circulation of the lubricating liquid. Air bubbles contained in the lubricating liquid discharged from the radial narrow gap 30 are pushed towards the thrust narrow gap. Air bubbles which have reached the thrust narrow gap are discharged towards the annular gap 33 through the effect of the thrust dynamic-pressure bearing. At this time, the lubricating liquid returns to the communicating path 12 while air bubbles are pushed outwardly through the annular gap and are discharged to the sealing gap due to the differences of shear flow velocities. Further, the circulation of lubricating liquid facilitates discharge of abrasion dusts resulted from contacts of the bearing surfaces or the like.

FIG. 7B illustrates an enlarged view of the portion encircled by the dot doffed line in FIG. 7A. Similarly to the second embodiment illustrated in FIGS. 6A and 6B, the flange surface is outwardly inclined. In this example, the values of g1, g2, g3, w1 and d1 are substantially the same as those of the second second embodiment. Further, the radius r2 of the flange-surface inner periphery is also the same, but the radius r3 of the outer periphery is 3.25 mm. Since r3 is smaller than that of the second embodiment, the difference between the value of r2/g2 and the value of r3/g3 is further increased.

In the present embodiment, the thrust plate 35 acts as a pull-out preventing member for the shaft. This eliminates the necessity of forming a pull-out preventing member at the back side of the flange surface, thus enabling reduction of the outer dimension of the flange surface. Obviously, in the present embodiment, the diameter of the flange surface may be arbitrarily increased in order to further enhance the oil-buffer function thereof.

Fourth Embodiment

Figure 8A:
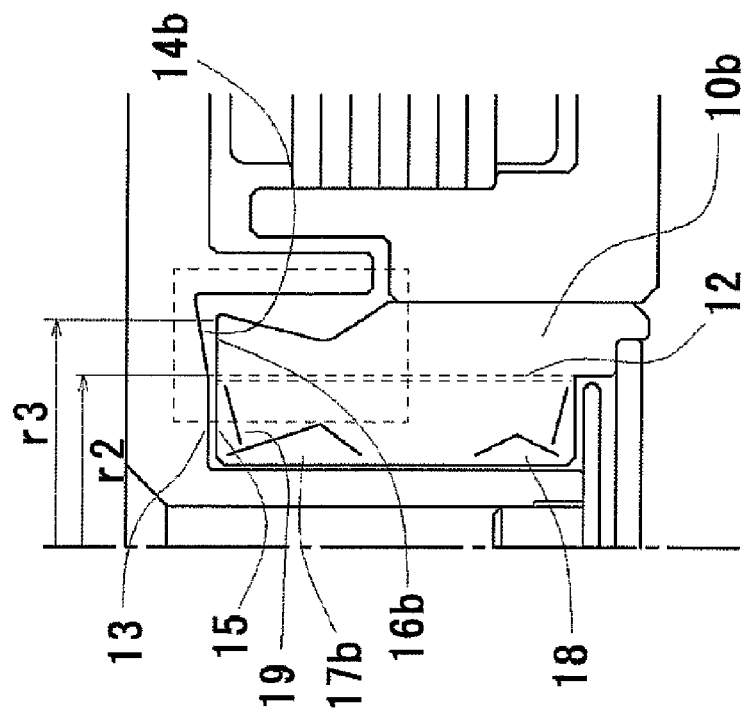
FIGS. 8A and 8B illustrate a modified embodiment of the embodiment of FIG. 7.
Figure 8B:
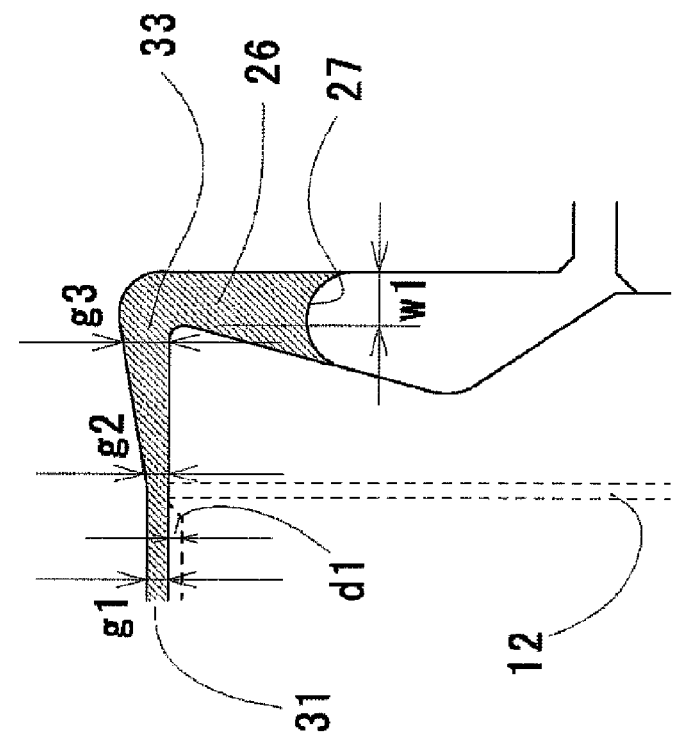

FIGS. 8A and 8B illustrate a fluid dynamic-pressure bearing device according to a modified embodiment of the embodiment 1 illustrated in FIGS. 7A and 7B. The sleeve and the housing are not separated and are constituted by a single member lob. The communicating pat 12 is constituted by an axial through hole formed by perforating the integral sleeve 10b. The thrust bearing surface 15 and the flange surface 16b of the fixed portion are both constituted by an end surface of the sleeve 10 b. In this embodiment, thrust dynamic-pressure generating grooves 19 are formed on the thrust bearing surface 15, while the flange surface is not provided with groove configurations such as stirring-up grooves.

On the other hand, the thrust bearing surface 13 and the annular surface 14b of the hub are not on the same plane. The annular surface 14b is upwardly inclined and therefore the dimension of the annular gap 33 is gradually outwardly increased. In the present embodiment, the values of g1, g2, g3, w1 and d1 are the same as those of the third embodiment.

Further, the radial dynamic-pressure bearing 17b placed at the upper portion, out of the radial dynamic-pressure bearings, is configured to downwardly increase the pressure of the lubricating liquid. Thus, the lubricating liquid circulates within the fluid dynamic-pressure bearing device along such a path that it proceeds downwardly through the radial bearing gap, passes through the communicating path 12 and returns to the annular gap 33. The direction of circulation is opposite to that of the dynamic-pressure bearing device of FIGS. 7A and 7B, but the device is similar thereto at the point that it offers the effect of discharging air bubbles and abrasion dusts.

With the fluid dynamic bearing device according to this embodiment, there is no need for preparing a separate housing, thus enabling reducing the number of components of the bearing.

Fifth Embodiment

Figures 9A, 9B:
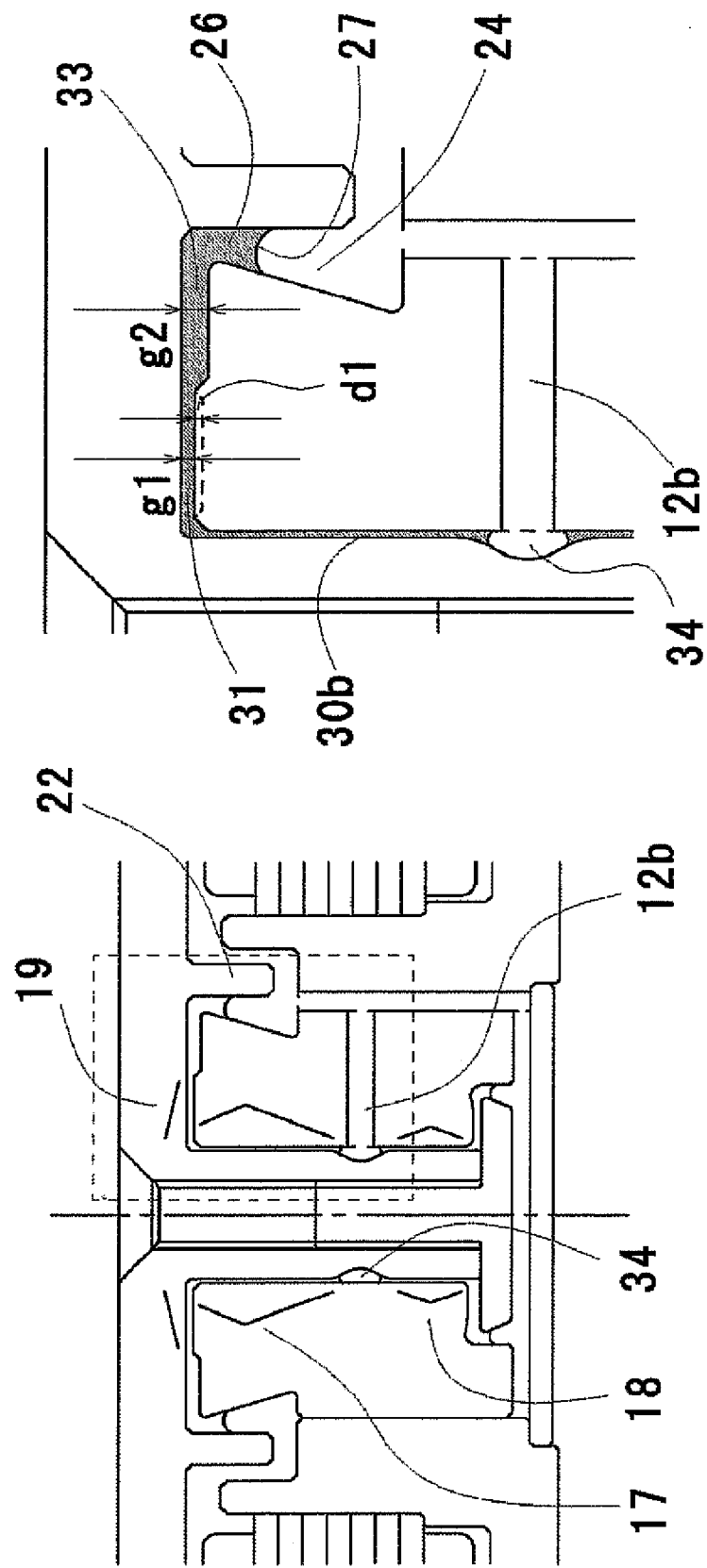
FIGS. 9A and 9B illustrate another embodiment 2 of the fluid dynamic-pressure bearing device according to the embodiment of the present invention.

FIGS. 9A and 9B illustrate a further embodiment 2 which belongs to the present invention. The lubricating liquid filled in the bearing gap is partitioned by an annular air gap 34 between the two radial dynamic bearings. The upper part of the partitioned lubricating liquid fills the radial narrow gap 30b, the thrust narrow gap 31 and the annular gap 33 in a continuous manner. The annular air gap 34 and the sleeve side surface are communicated with each other through a communicating path 12b, but the communicating path 12b is not filled with the lubricating liquid. Lubricating liquid can be injected into the bearing through the communicating path 12b when the bearing is fabricated.

The dimension g1 of the thrust narrow gap, the dimension g2 of the annular narrow gap and the depth d1 of the thrust dynamic-pressure generating grooves are set to the same values as those of the second embodiment and the condition according to the present invention is satisfied.

In this dynamic-pressure bearing device, similarly to in the bearing devices according to the other embodiments which have been described, the thrust dynamic-pressure bearing is biased inwardly, thus generating a small peripheral speed and a small bearing loss. Further, as well as the sealing gap 24, the annular gap also functions as an oil buffer, thus suppressing the occurrence of depletion of the lubricating liquid.

Sixth Embodiment

Figure 10:
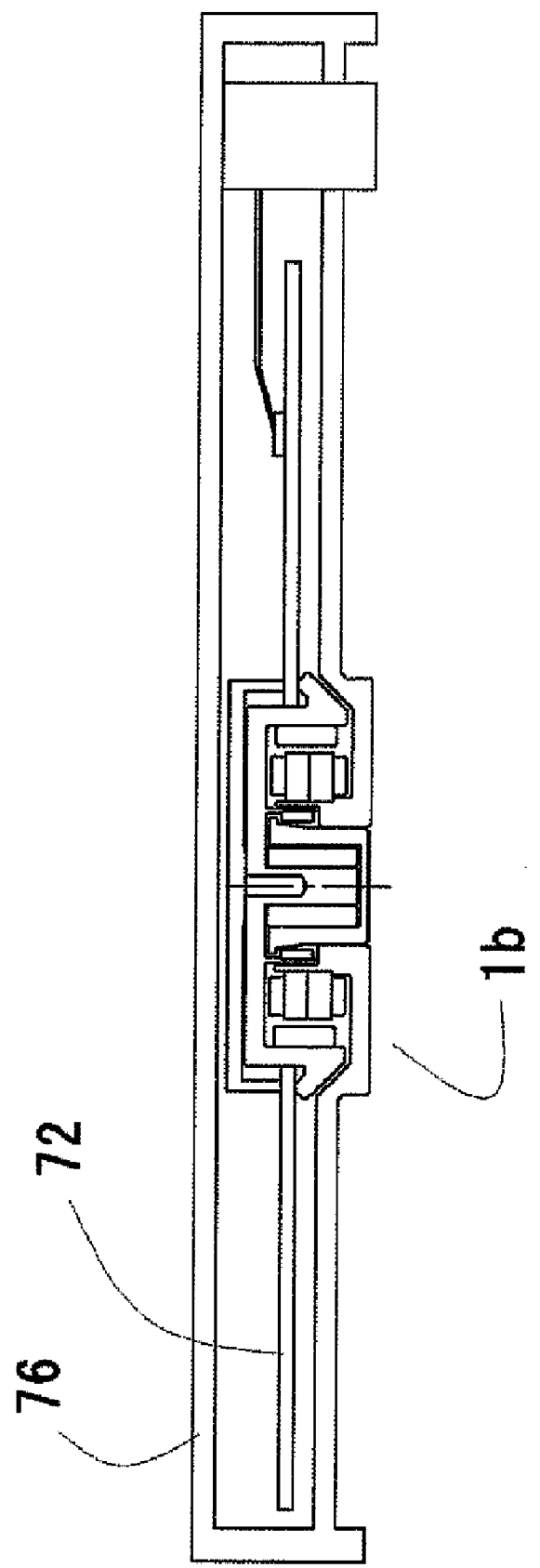
FIG. 10 illustrates a hard disk drive according to an embodiment of the present invention.
Figure 11:
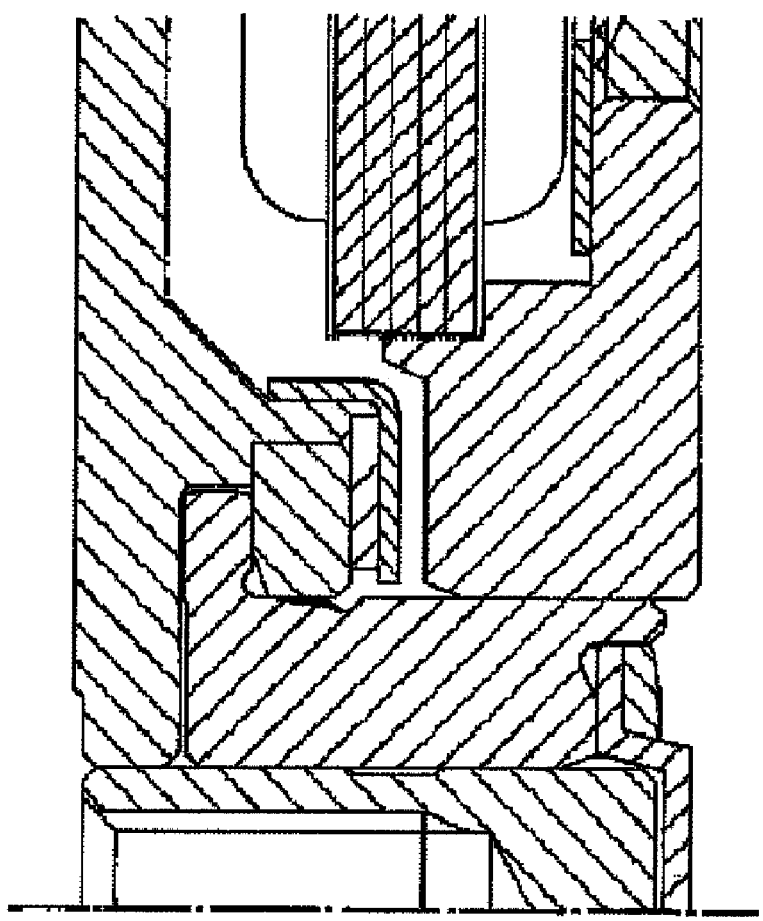
FIG. 11 illustrates a conventional dynamic-pressure bearing device.
Figure 12:
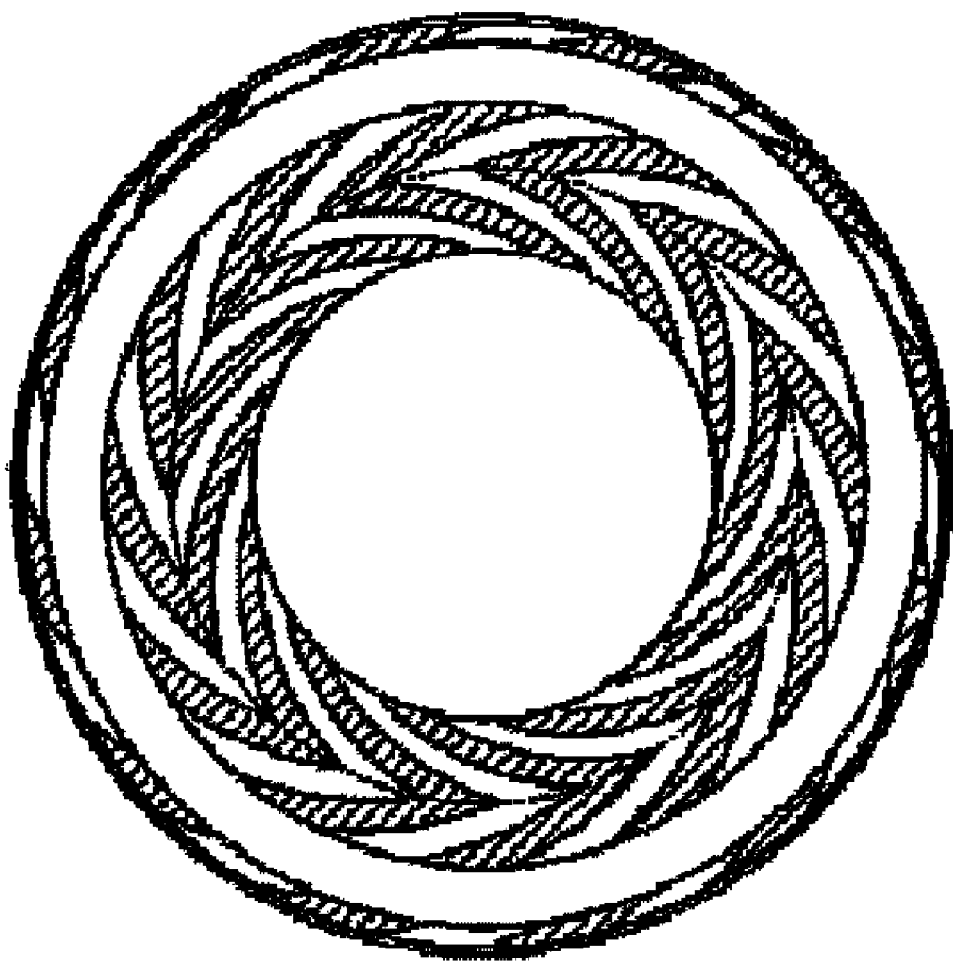
FIG. 12 illustrates another example of a conventional dynamic-pressure bearing device.
Figure 13:
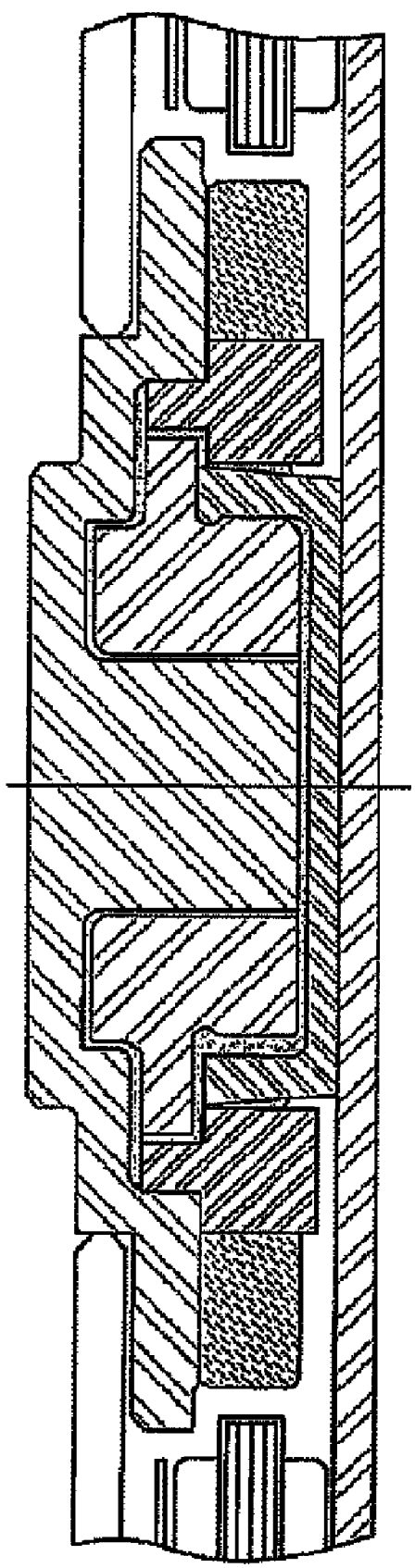
FIG. 13 illustrates a further example of a conventional dynamic-pressure bearing device.

FIG. 10 is a schematic view of a 1-inch hard-disk drive which belongs to the present invention. It incorporates a spindle motor 1b according to the present invention for rotating and driving a magnetic disk 72.

In the fluid dynamic-pressure bearing devices according to the present invention, the thrust dynamic-pressure bearing is formed at a relatively inner position and thus the supporting force thereof in the thrust direction is not necessarily large. However, in the case where such a small magnetic disk is driven, the weight of the rotor portion is small, thus not requiring a large thrust supporting force. The configuration according to the present invention which enables reduction of the bearing loss can offer the advantage of reduction of the electric power consumption. Since ultrasmall hard disks such as 1-inch hard disks are utilized for mobile applications in many cases, the reduction of the electric power consumption of the spindle motor offers a large advantage.

Further, for the fluid dynamic-pressure bearing devices configured such that the sleeve is inserted into the housing, out of the fluid dynamic-pressure bearing devices which have been described in the aforementioned first to sixth embodiments, the sleeve may be formed from a porous material such as sintered metal. In comparison with the case of forming the sleeve from a normal metal material, this can reduce the cost and also suppresses the occurrence of troubles due to abrasion dusts since the porous portion captures fine abrasion dusts.

What is claimed is:

1. A fluid dynamic-pressure bearing device comprising:
   a shaft;
   a hub from which the shaft extends toward the other end of the shaft in the axial direction and rotates with the shaft and includes a thrust bearing surface which extends outwardly in the radial direction from the one end of the shaft, an annular surface which extends outside of the thrust bearing surface outwardly in the radial direction, and a peripheral wall which surrounds the shaft and extends towards the other end;
   a fixed portion having a hole having a cylindrical inner peripheral surface, a thrust bearing surface formed to surround the opening of the hole at the one-end side and a flange surface facing the annular surface outside of the thrust bearing surface, the shaft being rotatably inserted into the hole;
   thrust dynamic-pressure generating grooves formed on one or both of the thrust bearing surface of the hub and the thrust bearing surface of the fixed portion;
   radial dynamic-pressure generating grooves formed on one or both of the outer peripheral surface of the shaft and the inner peripheral surface of the hole;
   a thrust narrow gap provided between the thrust bearing surface of the hub and the thrust bearing surface of the fixed portion which faces the thrust bearing surface of the hub;
   a radial narrow gap which is provided between the outer peripheral surface of the shaft and the inner peripheral surface of the hole that faces the outer peripheral surface of the shaft and is communicated with the thrust narrow gap at its one end;
   an annular gap which is provided between the flange surface and the annular surface when the hub and the fixed portion are rotated relative to each other, wherein the annular gap has an inner periphery communicated with the outer periphery of the thrust narrow gap and has a dimension greater than the dimension of the thrust narrow gap plus the average depth of the thrust dynamic-pressure generating grooves;
   a sealing gap which is formed between the outer peripheral surface of the fixed portion and the peripheral wall that faces thereto and is communicated with the outer periphery of the annular gap;
   a lubricating liquid which fills the thrust narrow gap, the radial narrow gap and the annular gap substantially without causing interruptions and fills at least a portion of the sealing gap;
   a thrust dynamic-pressure bearing comprising the thrust narrow gap, the lubricating liquid retained within the gap and the thrust dynamic-pressure generating grooves for generating dynamic pressures in the lubricating liquid; and
   a radial dynamic-pressure bearing comprising the radial narrow gap, the lubricating liquid retained within the gap and the radial dynamic-pressure generating grooves for generating dynamic pressures in the lubricating liquid.

2. The fluid dynamic-pressure bearing device according to claim 1, wherein at least a portion of the annular gap is gradually widened with increasing distance from the rotational center of the bearing towards the outer periphery.

3. The fluid dynamic-pressure bearing device according to claim 2, wherein the annular gap is narrower than the sealing gap when the hub and the fixed portion are rotated relative to each other.

4. The fluid dynamic-pressure bearing device according to claim 3, further comprising stirring-up grooves which are formed on one or both of the flange surface and the annular surface, wherein the stirring-up grooves generate radially-inward flows in the oil retained in the annular gap when the hub and the fixed portion are rotated relative to each other.

5. The fluid dynamic-pressure bearing device according to claim 2, further comprising stirring-up grooves which are formed on one or both of the flange surface and the annular surface, wherein the stirring-up grooves generate radially-inward flows in the oil retained in the annular gap when the hub and the fixed portion are rotated relative to each other.

6. The fluid dynamic-pressure bearing device according to claim 1, wherein the annular gap is narrower than the sealing gap when the hub and the fixed portion are rotated relative to each other.

7. The fluid dynamic-pressure bearing device according to claim 6, further comprising:
   an expanded portion provided on the outer peripheral surface of the fixed portion, the outer peripheral surface being expanded outwardly in the radial direction;
   an annular pull-out preventing member secured to the hub, the inner periphery of the annular pull-out preventing member being positioned more inwardly than the outer periphery of the expanded portion and being positioned closer to the other-end side in the axial direction than the outer periphery of the expanded portion; and
   a gap provided between the one-end side end surface of the pull-out preventing member at the inner periphery thereof and the other-end side end surface of the expanded portion at the outer periphery thereof, the gap corresponding to the axial play of the fluid dynamic-pressure bearing device.

8. The fluid dynamic-pressure bearing device according to claim 7, wherein:
   at least a portion of the peripheral wall defining the sealing gap is constituted by the inner peripheral surface of the pull-out preventing member having a cylindrical or conical inner peripheral surface; and
   the gap between the inner peripheral surface and the outer peripheral surface of the fixed portion which faces the inner peripheral surface is gradually widened with increasing distance from the annular gap and forms a taper sealing portion within which the interface of the lubricating liquid is positioned.

9. The fluid dynamic-pressure bearing device according to claim 6, further comprising stirring-up grooves which are formed on one or both of the flange surface and the annular surface, wherein the stirring-up grooves generate radially-inward flows in the oil retained in the annular gap when the hub and the fixed portion are rotated relative to each other.

10. The fluid dynamic-pressure bearing device according to claim 1, further comprising:
    an expanded portion provided on the outer peripheral surface of the fixed portion, the outer peripheral surface being expanded outwardly in the radial direction;
    an annular pull-out preventing member secured to the hub, the inner periphery of the annular pull-out preventing member being positioned more inwardly than the outer periphery of the expanded portion and being positioned closer to the other-end side in the axial direction than the outer periphery of the expanded portion; and a gap provided between the one-end side end surface of the pull-out preventing member at the inner periphery thereof and the other-end side end surface of the expanded portion at the outer periphery thereof, the gap corresponding to the axial play of the fluid dynamic-pressure bearing device.

11. The fluid dynamic-pressure bearing device according to claim 10, wherein:

at least a portion of the peripheral wall defining the sealing gap is constituted by the inner peripheral surface of the pull-out preventing member having a cylindrical or conicall inner peripheral surface; and the gap between the inner peripheral surface and the outer peripheral surface of the fixed portion which faces the inner peripheral surface is gradually widened with increasing distance from the annular gap and forms a taper sealing portion within which the interface of the lubricating liquid is positioned.

12. The fluid dynamic-pressure bearing device according to claim 11, wherein the thrust bearing surface and the annular surface of the hub are formed at different axial positions.

13. The fluid dynamic-pressure bearing device according to claim 1, further comprising stirring-up grooves which are formed on one or both of the flange surface and the annular surface, wherein the stirring-up grooves generate radially-inward flows in the oil retained in the annular gap when the hub and the fixed portion are rotated relative to each other.

14. The fluid dynamic-pressure bearing device according to of claim 1, wherein at least a part of the fixed portion is formed from an oil-impregnated porous material, the part being consisted of the cylindrical peripheral surface and/or the thrust bearing surface.

15. The fluid dynamic-pressure bearing device according to claim 1, further comprising a communicating path which is formed in the fixed portion, wherein the communicating path communicates the other-end side of the radial narrow gap with the outer periphery of the thrust narrow gap and is filled with the lubricating liquid substantially in a continuous manner.

16. The fluid dynamic-pressure bearing device according to claim 15, wherein the fixed portion is comprised of:

a housing having a bore which is closed at the other-end side and thus has a bottom and the flange surface around the opening of the hole at the one-end side; and a sleeve having the hole and the thrust bearing surface around the opening of the hole at the one-end side, the sleeve being fitted into the bore; and the communicating pat is comprised of:

communicating grooves formed on one or both of the outer peripheral surface of the sleeve and the inner peripheral surface of the housing, wherein the communicating grooves are closed at their open sides by the sleeve fit within the inner periphery of the housing to form through holes which communicate the one-end side of the sleeve with the other-end side thereof; and an other-end side gap provided between the other-end side surface of the sleeve and the closed inner peripheral surface of the housing, wherein the other-end side gap communicates the other-end side of the radial narrow gap with the other-end side of the through holes.

17. The fluid dynamic-pressure bearing device according to claim 1, wherein the thrust dynamic-pressure bearing is configured such that the pressure of the lubricating liquid is higher at the radially inner side of the thrust dynamic-pressure bearing than at the radially outer side thereof, when the shaft and the fixed portion are rotated relative to each other.

18. The fluid dynamic-pressure bearing device according to claim 1, wherein the thrust dynamic-pressure bearing comprises:

a first region including thrust dynamic-pressure generating grooves which are placed around the bearing center and are configured to increase the pressure of the lubricating liquid towards the bearing center when the shaft and the fixed portion are rotated relative to each other; and a second region including thrust dynamic-pressure generating grooves which are placed around the bearing center and radially inner region of the first region and are configured to increase the pressure of the lubricating liquid outwardly from the bearing center when the shaft and the fixed portion are rotated relative to each other.

19. The fluid dynamic-pressure bearing device according to claim 1, wherein the fluid dynamic-pressure bearing device includes two radial dynamic-pressure bearings at two positions along the longitudinal direction of the shaft, at least one of these two radial dynamic-pressure bearings being configured to increase the pressure of the lubricating liquid constituting this radial dynamic-pressure bearing towards the other radial dynamic-pressure bearing.

20. A hard disk driving device comprising a spindle motor and only one magnetic recording disk with a diameter of 1.8 inch or less mounted on the spindle motor, wherein the spindle motor comprises:

a shaft;

a hub from which the shaft extends toward the other end of the shaft in the axial direction and rotates with the shaft and includes a thrust bearing surface which extends outwardly in the radial direction from the one end of the shaft, an annular surface which extends outside of the thrust bearing surface outwardly in the radial direction, and a peripheral wall which surrounds the shaft and extends towards the other end;

a fixed portion having a hole having a cylindrical inner peripheral surface, a thrust bearing surface formed to surround the opening of the hole at the one-end side and a flange surface facing the annular surface outside of the thrust bearing surface, the shaft being rotatably inserted into the hole;

thrust dynamic-pressure generating grooves formed on one or both of the thrust bearing surface of the hub and the thrust bearing surface of the fixed portion;

radial dynamic-pressure generating grooves formed on one or both of the outer peripheral surface of the shaft and the inner peripheral surface of the hole;

a thrust narrow gap provided between the thrust bearing surface of the hub and the thrust bearing surface of the fixed portion which faces the thrust bearing surface of the hub;

a radial narrow gap which is provided between the outer peripheral surface of the shaft and the inner peripheral surface of the hole that faces the outer peripheral surface of the shaft and is communicated with the thrust narrow gap at its one end;

an annular gap which is provided between the flange surface and the annular surface when the hub and the fixed portion are rotated relative to each other, wherein the gap has an inner periphery communicated with the outer periphery of the thrust narrow a and has a dimension greater than the dimension of the thrust narrow gap plus the average depth of the thrust dynamic-pressure generating grooves;

a sealing gap which is formed between the outer peripheral surface of the fixed portion and the peripheral wall that faces thereto and is communicated with the outer periphery of the annular gap;

a lubricating liquid which fills the thrust narrow gap, the radial narrow gap and the annular a substantially without causing interruptions and fills at least a portion of the sealing gap;

a thrust dynamic-pressure bearing comprising the thrust narrow gap, the lubricating liquid retained within the gap and the thrust dynamic-pressure generating grooves for generating dynamic pressures in the lubricating liquid; and a radial dynamic-pressure bearing comprising the radial narrow gap, the lubricating liquid retained within the gap and the radial dynamic-pressure generating grooves for generating dynamic pressures in the lubricating liquid.

* * * * *